United States Patent [19]

Frank

[11] 4,185,986
[45] Jan. 29, 1980

[54] APPARATUS FOR HANDLING GLASS SHEETS DURING SHAPING AND COOLING

[75] Inventor: Robert G. Frank, Murrysville, Pa.

[73] Assignee: PPG Industries, Inc., Pittsburgh, Pa.

[21] Appl. No.: 954,693

[22] Filed: Oct. 25, 1978

[51] Int. Cl.$^2$ .................. C03B 23/02; C03B 27/00
[52] U.S. Cl. .......................... 65/287; 65/273; 65/286; 65/348; 414/749
[58] Field of Search .............. 65/273, 275, 286, 287, 65/348, 349, 350, 351; 214/1 BB

[56] References Cited
U.S. PATENT DOCUMENTS

| | | |
|---|---|---|
| 2,003,383 | 6/1935 | Miller .............................. 65/107 X |
| 2,805,520 | 9/1957 | Black ................................ 65/107 |
| 2,869,287 | 1/1959 | Bamford ........................... 65/106 |
| 3,418,098 | 12/1968 | Kirkman ........................... 65/273 |
| 3,468,645 | 9/1969 | McMaster et al. ............... 65/275 X |
| 3,527,589 | 9/1970 | Ritter, Jr. ......................... 65/273 X |
| 3,846,104 | 11/1974 | Seymour ........................... 65/106 X |
| 3,846,106 | 11/1974 | Seymour ........................... 65/114 |
| 4,092,141 | 5/1978 | Frank ............................... 65/273 X |

Primary Examiner—Arthur D. Kellogg
Attorney, Agent, or Firm—Dennis G. Millman; Edward I. Mates

[57] ABSTRACT

This invention relates to apparatus for handling glass sheets during shaping and cooling, and in particular to a ring-like member having stop means spaced upstream of an outline supporting surface conforming to and slightly inside the periphery of a bent glass sheet supported thereon to define a position for engaging the trailing edge of the glass sheet while conveying the latter in a downstream direction from a shaping station to a cooling station. The ring-like member has a pair of downstream end portions that are transversely spaced from one another to provide a clearance space to permit the ring-like member to begin to return in an upstream direction to the shaping station before the shaped glass sheet is transferred to a position completely downstream of the ring-like member.

8 Claims, 25 Drawing Figures

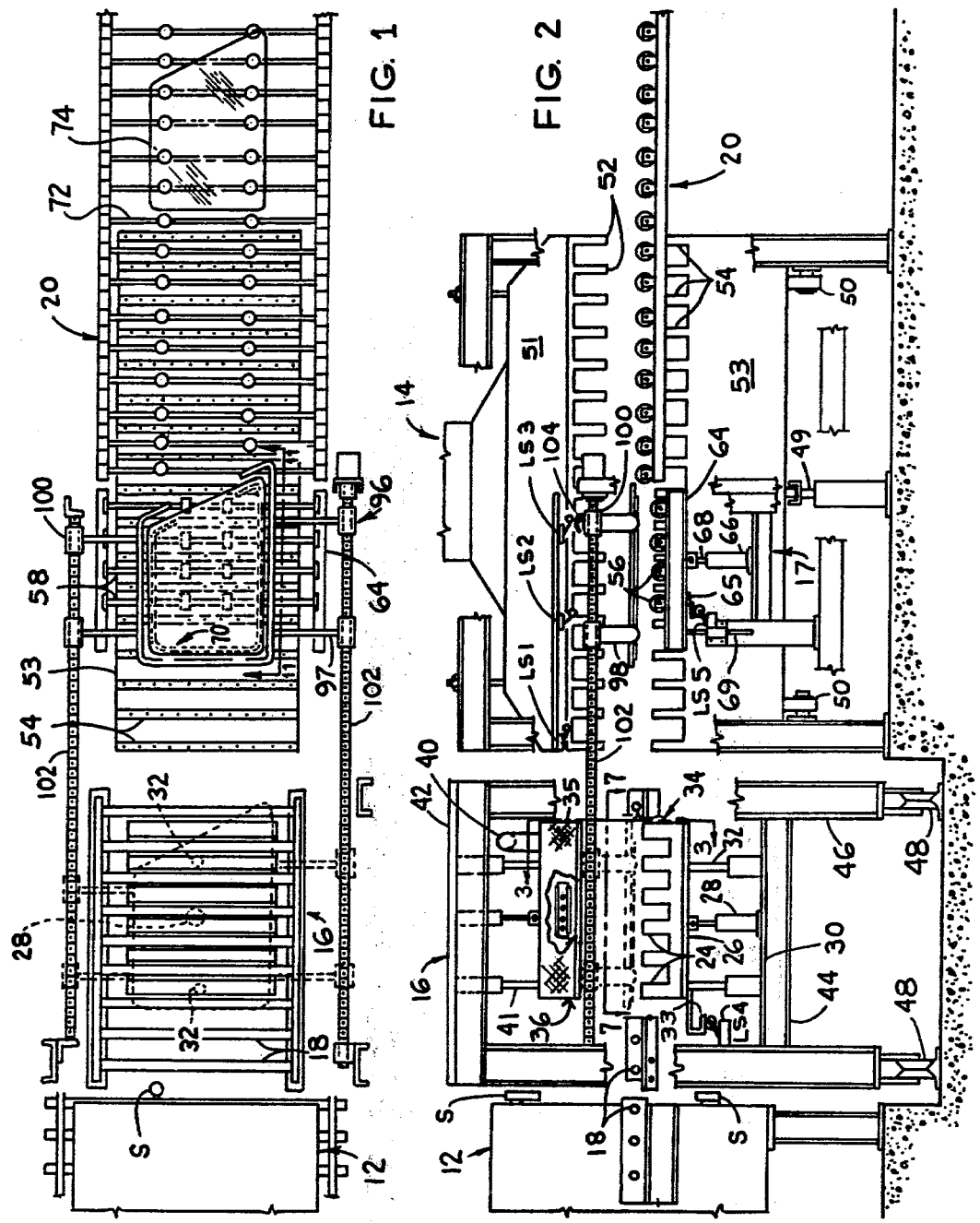

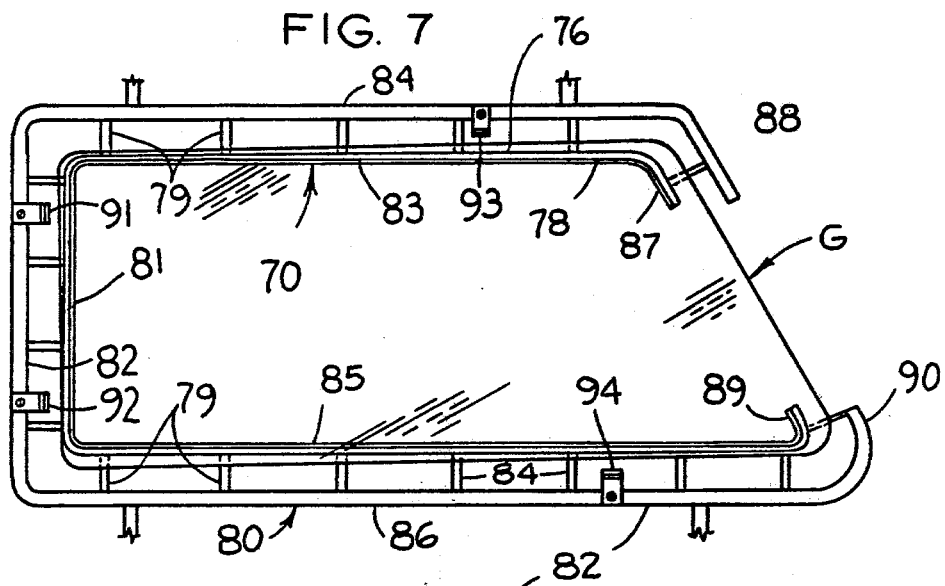
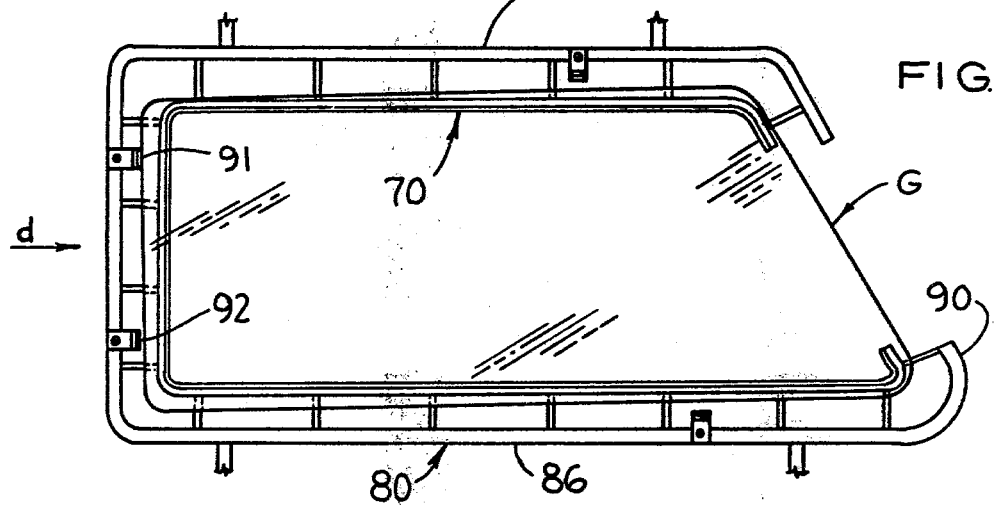
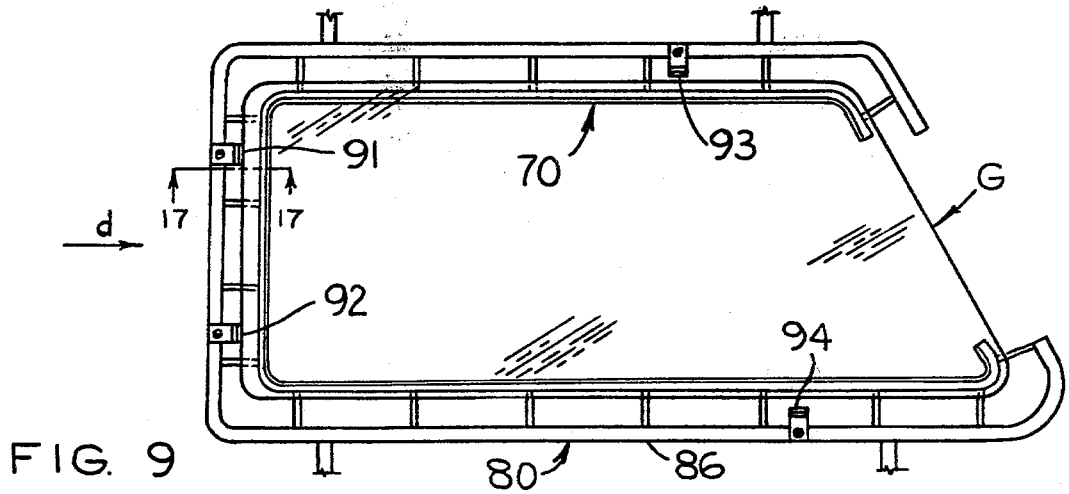

APPARATUS FOR HANDLING GLASS SHEETS DURING SHAPING AND COOLING

RELATION TO OTHER APPLICATIONS

The subject matter of the present application is related to the subject matter of the following patent applications of Robert G. Frank all filed on the same date as the present application:

Ser. No. 954,697 for Handling Glass Sheets during Shaping and Cooling;

Ser. No. 954,695 for Vacuum Mold with Uniform Release Means; and

Ser. No. 954,694 for Glass Sheet Tempering Apparatus; and

Patent application Ser. No. 954,696, of Robert G. Frank, Rudy Canonaco and Richard V. Posney for Slotted Glass Sheet Shaping Mold.

BACKGROUND OF THE INVENTION

1. Field of the Invention

This invention relates to apparatus useful in the shaping and cooling of glass sheets and particularly in the high speed production of bent glass sheets that are toughened by air quenching, and most particularly, for shaping and heat treating relatively thin glass sheets.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and into a shaping station where each glass sheet in turn is transferred onto a lifting member that lifts the glass sheet into engagement with a vacuum mold. The vacuum mold holds the shaped glass by suction while the lifting member retracts to below the substantially horizontal path. At about the same time, a transfer and tempering ring having an outline shape conforming to that of the glass sheet slightly inboard of its perimeter moves upstream into a position below the vacuum mold and above the lifting member. Release of the vacuum deposits the shaped glass sheet onto the tempering ring.

When prior art apparatus transferred a shaped glass sheet from the vacuum mold onto the transfer and tempering ring in misaligned or misoriented relation to the latter, the glass sheet shape would depart from required tolerances. No provision was available to remedy such a defect except to destroy the article so produced in order to avoid a customer complaint. In addition, while prior art apparatus kept improving the speed of glass sheet bending and tempering, there still remained a need for further improvement, particularly in the shaping and tempering of thinner glass sheets than those required prior to the need to supply thinner tempered glass windows for automobiles in order to lighten the vehicle, thereby reducing its rate of fuel consumption.

2. The Prior Art

U.S. Pat. No. 2,003,383 to Robert A. Miller and U.S. Pat. No. 2,805,520 to Lloyd V. Black are patents that show alignment stop members mounted adjacent the perimeter of a glass sheet shaping mold to limit the misalignment between the glass sheet and the mold as the sheet sags toward an upward facing shaping surface of the mold. U.S. Pat. No. 2,869,267 to William P. Bamford shows movable end stops that follow the opposite longitudinal edges of a glass sheet as the latter sags toward a mold shaping surface.

U.S. Pat. No. 3,846,104 to Seymour provides method and apparatus in which glass sheets are conveyed through a furnace on conveyor means, and heated while passing through the furnace to a temperature approaching the glass softening point. At a shaping station beyond the furnace, each glass sheet in turn is lifted by a lower outline shaping mold which raises the glass sheet into engagement with an upper vacuum mold having a shape conforming to that desired for the glass. The upper vacuum mold remains at the shaping station and holds the shaped glass thereagainst as the lower shaping mold retracts to below the level of the conveyor means. A tempering ring shaped to support the bent glass sheet adjacent its marginal or peripheral edge only, moves generally horizontally between the shaping station and a cooling station to receive each shaped glass sheet released by the vacuum and transfer it to the cooling station.

U.S. Pat. No. 4,092,141 to Robert G. Frank and DeWitt W. Lampman further improves the efficiency of a glass sheet bending and cooling apparatus by providing vertically movable sheet transfer means for rapidly removing from the tempering ring each bent glass sheet after the latter has had its surfaces hardened sufficiently to permit it to be conveyed on an additional downstream conveyor providing a glass sheet supporting surface at an elevation slightly higher than the level at which the glass sheet is supported by the transfer and tempering ring. However, the apparatus of this patent requires that the return movement of the tempering ring to the shaping station be delayed until after the trailing edge of the shaped, surface-hardened glass sheet has moved downstream into a position where the entire glass sheet is completely beyond the transfer and tempering ring.

The sheet transfer means for removing the glass from the tempering ring to the additional downstream conveyor according to the Frank and Lampman patent comprises a frame support and a lifting and lowering mechanism for raising and lowering the frame support and a plurality of rotating conveyor rolls having doughnut-shaped support members carried by the frame support. The apparatus is so constructed that the coating conveyor rolls of the sheet transfer means move vertically between a recessed position clear of the movement of the tempering ring and its supporting carriage and a transfer position wherein the rotating conveyor rolls have a common upper tangential surface and provide rotating elements of a glass sheet supporting surface disposed above the level of support provided by the tempering ring and at a level of support provided by the upper tangential surface common to the rolls of the additional downstream conveyor.

The prior art patents fail to provide means at the shaping station to insure that each shaped glass sheet is oriented and aligned on the tempering ring in proper orientation and alignment thereon so that it retains its proper shape while cooling. Furthermore, the need to bend and temper thinner glass sheets (4 millimeters thick or less) than thicknesses handled previously (4.5 to 6 millimeters) makes it desirable to incorporate means to reduce the time required for the apparatus to complete a cycle of bending and tempering, particularly the time needed to transport a heated glass sheet through a shaping station and completely into a cooling station, because thin, hot glass sheets lose their shape more rapidly than thicker glass sheets and also cool more rapidly to a temperature below which it becomes difficult if not impossible to impart an adequate temper in the glass.

SUMMARY OF THE INVENTION

The present invention provides apparatus that helps to reduce the time necessary to complete a bending and tempering operation in which a glass sheet is transferred from a shaping station to a cooling station. In particular, the present invention provides an open-ended ring-like member having a pair of upstream end stops adjacent its trailing edge and downstream end portions transversely spaced from one another to provide a clearance space at its downstream end. The ring-like member is loaded with a glass sheet initially in such a manner that the glass sheet has its trailing edge spaced a slight distance downstream of the end stops when it is originally deposited on the ring-like member. The ring-like member is started suddenly to slide the glass sheet relative to the ring-like member until the trailing edge of the glass sheet comes into alignment with the end stops. This technique makes it more convenient to drop the glass sheet onto the ring-like member when its upstream end stops are upstream of the trailing edge of the glass. There is no need to adjust the apparatus to a precision needed to insure depositing the glass sheet initially with its trailing edge in exactly the alignment and orientation desired with the upstream edge stops and not deposited over the upstream edge stops.

The ring-like member can be accelerated as rapidly as possible to positively align the glass sheet thereon while transferring the sheet to a cooling station without fear of misaligning or misorienting the glass sheet before it hardens. Prior art apparatus limited the speed of transfer of the glass sheet to the cooling station to avoid misaligning and misorienting the glass sheet during its transfer. Hence, the present invention reduces the time needed to transfer a glass sheet from the shaping station to the cooling station.

Another feature of the present invention enables the ring-like member to start its return to the shaping station sooner than permitted by the prior art and, specifically, before vertically movable rotating conveyor rolls of sheet transfer means have moved the tempered glass sheet beyond the extreme downstream position that the ring-like member occupies during a production cycle and before the rotating rolls of the sheet transfer means are lowered to their recessed position.

The present invention is also capable of correcting the orientation as well as misalignment of a glass sheet relative to a tempering ring or ring-like member, although misorientation is hard to obtain with the apparatus of the present invention.

The present invention will be better understood in the light of a description of an illustrative embodiment that follows, which description includes the accompanying drawings wherein like reference numbers refer to like structural elements.

BRIEF DESCRIPTION OF THE DRAWINGS

FIG. 1 is a fragmentary, plan view of apparatus for shaping and tempering glass sheets incorporating a preferred embodiment of the present invention, with certain parts omitted for clarity, showing a tempering ring of the present invention in solid lines supporting a glass sheet at sheet transfer means and showing in phantom the position of the tempering ring at a shaping station and that of a glass sheet conveyed on additional conveyor rolls en route to an unloading station;

FIG. 2 is a fragmentary, longitudinal view of the embodiment of FIG. 1 with certain parts omitted or broken away or shown in inconsistent positions to show other parts of the apparatus more clearly and with certain positions depicted in phantom consistent with FIG. 1;

FIG. 7 is a fragmentary, partially schematic plan view of the ring-like member and its reinforcing means taken along the lines 7—7 of FIG. 2 depicting the ring-like member in a position below an upper vacuum mold at a shaping station at the moment immediately following FIG. 6 when a glass sheet is deposited thereon;

FIG. 8 is a plan view of the ring-like member and its reinforcing means similar to FIG. 7 taken immediately after the ring-like member has started moving to the right of its position depicted in FIG. 7;

FIG. 9 is a plan view similar to FIGS. 7 and 8 showing the ring-like member at a moment immediately after the moment depicted in FIG. 8;

DESCRIPTION OF THE PREFERRED EMBODIMENT

Figure 3:
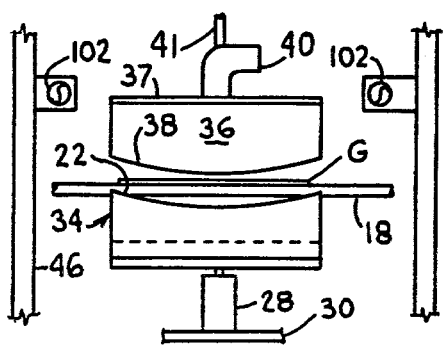
FIG. 3 is a cross-sectional view taken across the shaping station along lines 3—3 of FIG. 2 showing a flat, hot glass sheet entering the shaping station with the shaping molds separated from one another.

Referring now to FIGS. 1 and 2 of the drawings, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor 20 for transport to the unloading station.

Heat may be supplied in the furnace 12 by hot gases from gas burners or by electrical radiant heaters or by a combustion of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element S is located beyond the exit of furnace 12 to initiate a cycle of operation of this apparatus.

Limit switches LS-1 through LS-5 are provided to synchronize the operation of various elements of the apparatus according to a predetermined sequence. The glass sensing element S, the limit switches LS-1 through LS-5 and various timer circuits actuated thereby cooperate to provide synchronizing means for the apparatus of the present specification.

Figure 4:
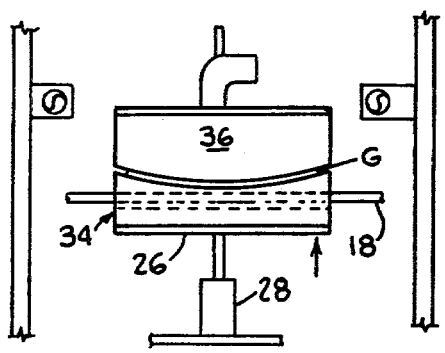
FIG. 4 is a view similar to FIG. 3 taken immediately thereafter, showing how the hot, glass sheet is engaged between an upper vacuum mold and a lower lifting mold to shape the glass sheet.
Figure 5:
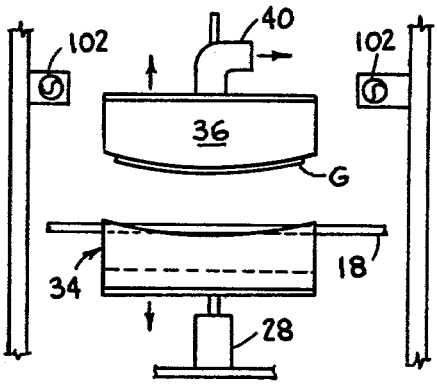
FIG. 5 is a view similar to FIGS. 3 and 4, taken immediately after FIG. 4, showing how the upper vacuum mold supports the glass sheet while the bottom shaping mold is being retracted.
Figure 6:
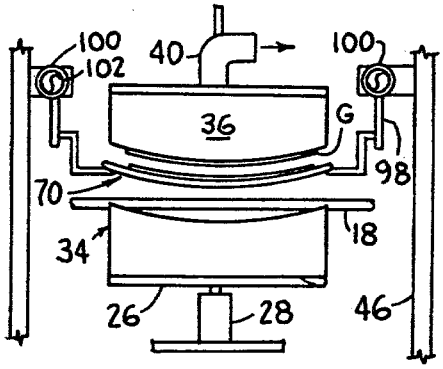
FIG. 6 is a view similar to FIG. 5, showing the lower shaping mold fully retracted and a ring-like member constructed in accordance with the present invention in position to receive the glass sheet from the upper vacuum mold.

The shaping station 16 comprises a lower shaping mold 34 and an upper vacuum shaping mold 36. The latter is composed of metal covered with a refractory material such as fiber glass 35 as is well known in the art. The former comprises an upper surface 22 (FIGS. 3 to 6) conforming in elevational shape to the shape desired for a glass sheet to be bent. The upper surface 22 is interrupted by intermittent transversely extending grooves 24 which provide clearance for raising and lowering the lower shaping mold 34 between a recessed position below the conveyor rolls 18, as depicted in FIGS. 3, 5 and 6, and an upper position above the level of said conveyor rolls, as depicted in FIG. 4. The lower shaping mold 34 is fixed to a lower mold support 26 and readily detachable therefrom to substitute a mold 34 for a different production pattern.

Since automobile side windows have a fairly constant radius of curvature about a horizontal axis in order to facilitate their raising and lowering in an automobile body between an open and a closed position, many different patterns in a family of patterns have different outline shapes but are bent to the same radius of curvature. Therefore, it is desirable to have one lower shaping mold capable of producing each family of patterns. It has been found that a lower shaping mold of a given radius of curvature having longer dimensions than a family of side windows of said given radius of curvature but of different outline shapes and/or different dimensions can fabricate curved side windows of said family of different sizes but of said given radius of curvature. In the apparatus of this specification, one lower shaping mold can be installed in conjunction with an upper vacuum shaping mold of complementary curvature to produce any pattern of a family of patterns having a given radius of curvature but of different sizes and/or outline shapes without requiring any removal or replacement of the lower shaping mold until such time as production requirements call for a production pattern from a family of patterns having a different radius of curvature.

The amount of time needed to remove a mold for one pattern and to install a replacement mold for another pattern of the same family having the same radius of curvature but a different outline shape and/or size is considerable and would interfere with time that could be used in production. A lower shaping mold constructed of an outline configuration unique for each production pattern requires replacement of the mold for one having a different outline configuration even when the new production pattern has the same radius of curvature as the previous production pattern. Providing a shaping surface that is universal for all production pattern outlines of a family of patterns having a given radius of curvature reduces lost production time.

The upper surface 22 of the lower shaping mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE.

Raising and lowering means in the form of a piston 28 rigidly mounted to a piston support platform 30 raises and lowers support 26 and its attached lower shaping mold 34. Alignment posts 32 are attached to mold support 26 to assure vertical movement of the lower mold 34. A lug 33 is connected to mold 34 to actuate limit switch LS-4.

The upper vacuum mold 36 has an upper mounting plate 37 and a lower wall 38 that is apertured, as well as side walls 39, at least one of the latter being apertured. The lower wall 38 is shaped to be complemental to the shaping surface formed by the upper surface 22 of the lower shaping mold 34. The upper vacuum mold 36 communicates with a source of vacuum (not shown) through an evacuation pipe 40 and a suitable valve (not shown). The upper vacuum mold 36 is suitably connected through upper vertical guide rods 41 to an upper supporting frame 42 and movable relative thereto by an upper vertical piston 43. The upper vacuum mold 36 is readily detached from its upper mounting plate 37 to permit rapid substitution of another upper vacuum mold 36 conforming to a different production pattern. The evacuation pipe 40 may be connected through a suitable valve arrangement to a source of pressurized air (not shown) and the valves for the vacuum line and for the pressure line may be synchronized according to a predetermined time cycle in a manner well known in the art.

Figure 19:
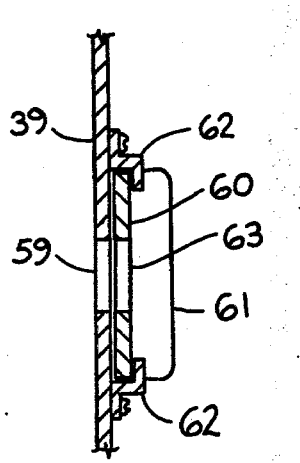
FIG. 19 is a sectional view taken along lines 19—19 of FIG. 18 of a portion of the apertured side wall of the upper vacuum mold, showing an apertured sliding plate with its apertures aligned with the apertures of the apertured side wall for use in handling glass sheets of irregular outline.
Figure 20:
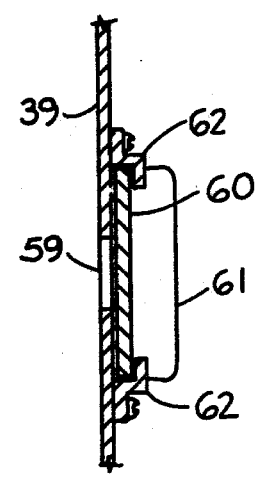
FIG. 20 is a view similar to FIG. 19, showing the apertured sliding plate with its apertures completely offset from the apertures of the apertured side wall of the upper vacuum mold for use in handling glass sheets of rectangular outline.
Figure 21:
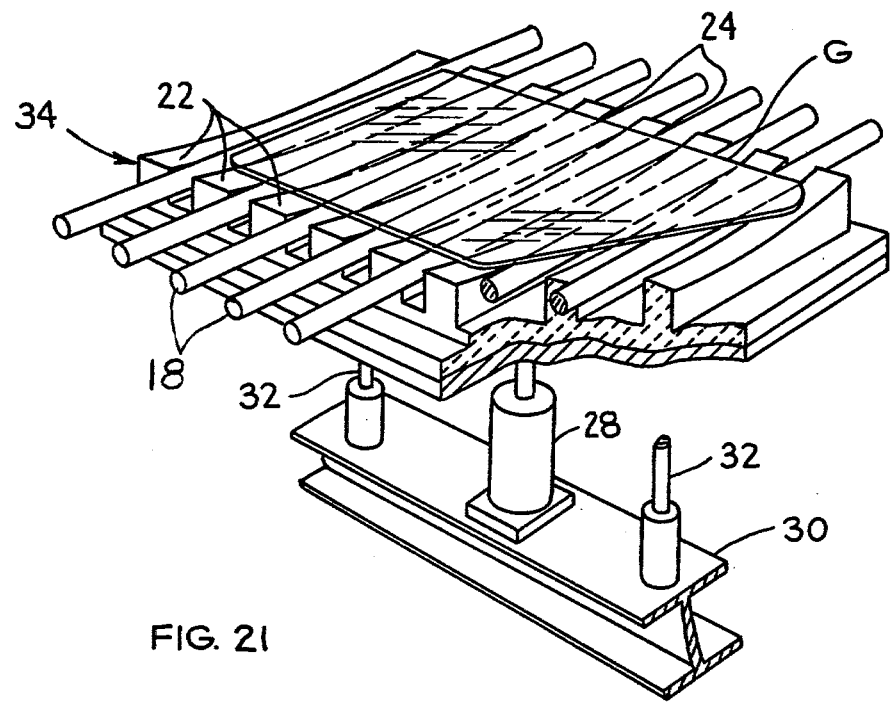
FIG. 21 is a fragmentary perspective view of the lower shaping mold in its retracted position with parts removed to show certain parts in section.
Figure 22:
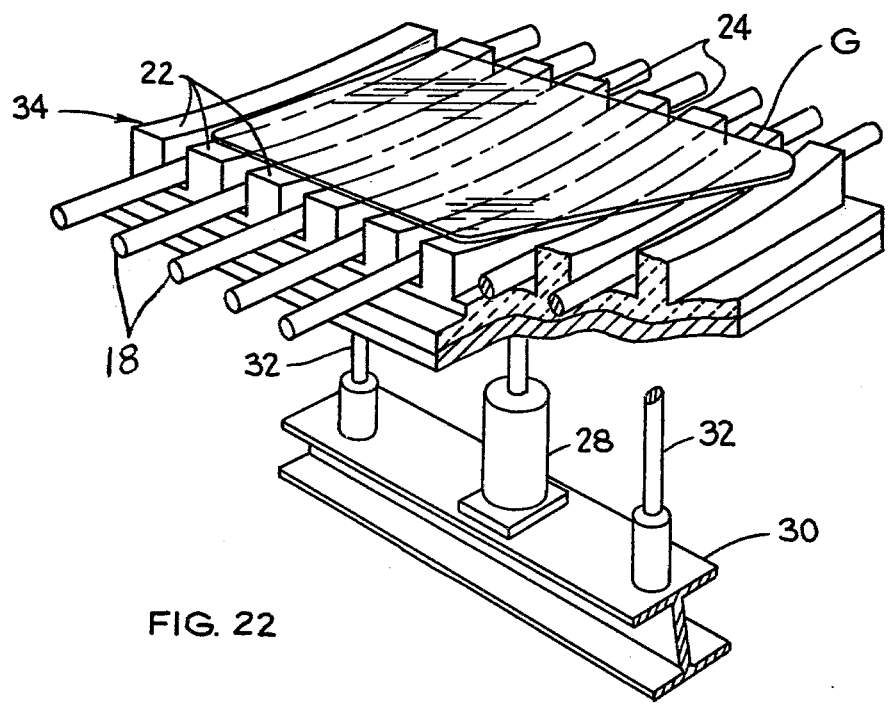
FIG. 22 is a view similar to FIG. 21 showing the lower shaping mold in a position it passes through while a glass sheet from conveyor rolls to an elevated position in engagement with the upper vacuum shaping mold.
Figure 23:
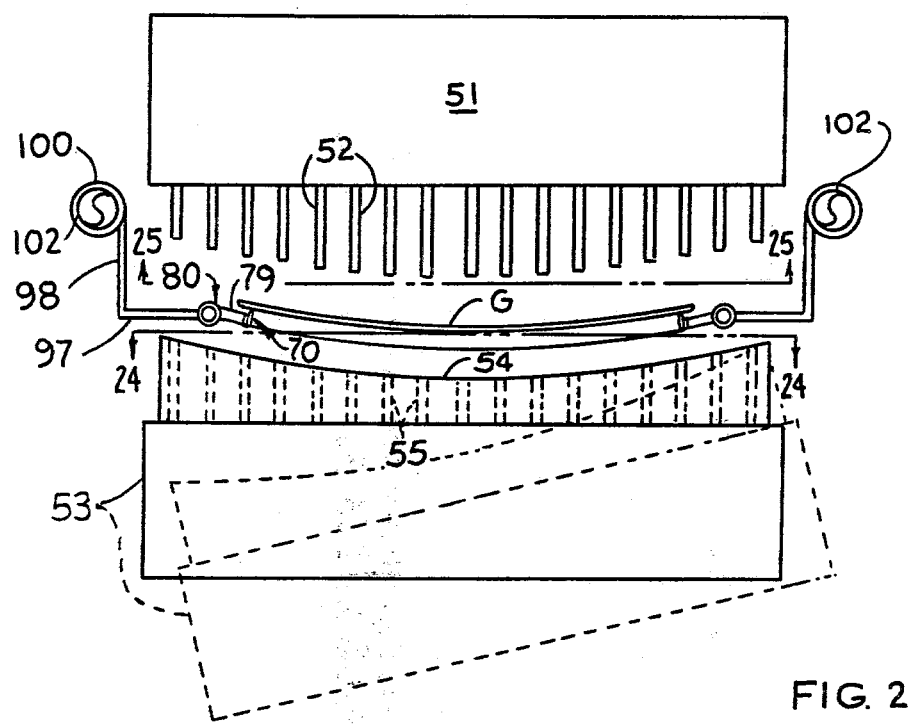
FIG. 23 is an end elevation of the cooling station taken in full lines across its entrance at a time when the ring-like member is crossing said entrance, and showing in phantom an oblique position assumed by a lower set of bar-type nozzles in order to dump cullet rapidly.
Figure 24:
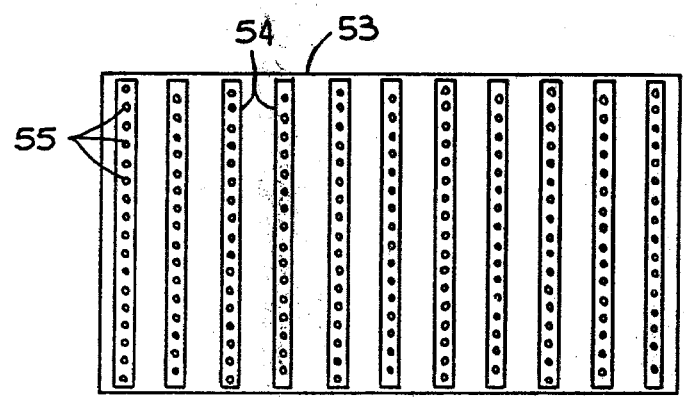
FIG. 24 is a plan view of the set of bar-type lower nozzles taken along the line 24—24 of FIG. 23.
Figure 25:
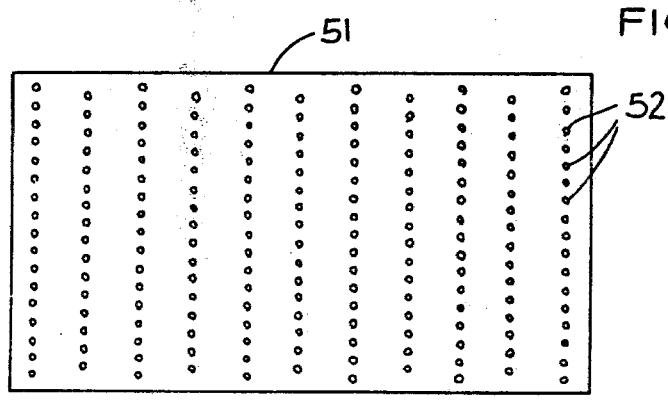
FIG. 25 is a bottom view looking up at the bottom of a set of upper pipe nozzles taken along the line 25—25 of FIG. 23.

Any portion of a side wall 39 of the upper vacuum shaping mold 36 that contains apertures 59 is also provided with an apertured slide 60 having a tab 61 at one end thereof (FIGS. 19 and 20). The slide 60 has its longitudinal side portions engaged by a pair of parallel Z-shaped guides 62. The latter are attached along their length to the side wall 39. The tab 61 can move between the Z-shaped guides 62 when the position of the apertured slide 60 is adjusted relative to the apertured side wall 39. The apertured slide 60 has apertures 63 corresponding in size, shape and space therebetween to the arrangement of the apertures 59 in apertured wall 39.

FIG. 19 shows the apertured slide 60 occupying a position in which its apertures 63 are completely aligned with the apertures 59 in apertured side wall 39 to provide a maximum effective open area for the side wall 39. FIG. 20 shows the apertured slide 60 occupying a position in which the apertures 63 face the spaces between the apertures 59 in the side wall 39 so as to enable side wall 39 to behave in the same manner as a continuous side wall with no effective open area. It is understood that the slide 60 may be adjusted in any position in which its apertures 63 are partially aligned with apertures 59 or in which only one or more of its apertures 63 are partially or completely aligned with one or more apertures 59 to provide a desired amount of effective open area in the side wall 39 and means for adjusting the amount of open area as needed.

The reason for providing apertures 59 in at least one of the side walls 39 and an apertured slide 60 therefor is to insure that a glass sheet G drops uniformly onto a ring-like member 70 without tilting from the orientation at which it is engaged against the apertured lower wall 38 of upper vacuum shaping mold 36 when vacuum is released from the latter. When small apertures are uniformly distributed throughout the apertured lower wall 38 and the glass sheets treated have a uniform outline shape, such as an essentially rectangular or circular outline, air under pressure acts uniformly around the perimeter of the glass sheet to cause the latter to drop without tilting onto the ring-like member 70 when vacuum is released in upper vacuum mold 36. However, when a treated glass sheet has an irregular outline, upon releasing the vacuum, air enters the vacuum chamber of the upper vacuum mold 36 through the small apertures in such a manner as to cause a temporary pressure gradient within the upper vacuum mold 36. This pressure gradient produces a non-uniform downward thrust against the upper surface of the glass sheet that was previously supported against the apertured lower wall by vacuum. This non-uniform downward thrust causes the released glass sheet to tilt as it drops toward the ring-like member 70. Providing additional apertures having an effective open area that can be adjusted for the upper vacuum mold provides relatively rapid inflow of air into the upper vacuum shaping mold that masks the effect of the relatively slow flow of air through the relatively small apertures in the apertured bottom wall 38 to cause the glass sheet to tilt as it drops toward the ring-like member 70.

The relative size of the total effective open area of the apertures 59 and 63 compared to the total area of the apertures in the apertured bottom wall 38 that do not face a glass sheet supported by vacuum thereagainst determines the effectiveness of the apertured slide 60 and apertures 59 in apertured side wall 39 to overcome the tilting tendency. Other factors involved in determining the amount of effective open area of apertures 59 and 63 relative to the total area of the apertures of apertured wall 38 that are exposed when the apertured wall 38 engages a glass sheet that is required to insure a non-tilting transfer of the glass sheet from the upper vacuum shaping mold 36 to the ring-like member 70 include the area, thickness and irregularity of outline shape of the glass sheet pattern being treated.

Increasing the effective open area of aligned openings 59 and 63 reduces the chances of tilting the disengaged glass sheet en route to the ring-like member 70 when the vacuum is released on the upper vacuum shaping mold 36 for any particular glass sheet pattern. However, if the effective open area is made too great, suction apparatus consuming a great amount of energy is required. In the interest of energy conservation, the effective open area of the aligned openings is made as small as possible consistent with the open area necessary to insure a glass sheet transfer without tilting.

The apertures in the apertured lower wall 38 are made as small as possible and are spaced as closely as is necessary to assure vacuum support for a hot glass sheet with reasonable energy consumption. For an upper vacuum mold having a glass sheet engaging apertured lower wall 38 with dimensions 46 inches (117 cm) long and 22 inches (56 cm) wide, apertures having a diameter of 0.09 inches (0.23 cm) and spaced apart from one another 1.5 inches (3.8 cm) in a rectangular or diamond pattern have been found to work adequately in handling glass sheets whose weight is up to 20 pounds (9 Kgm). Five apertures, each having a diameter of one inch (25.4 mm) spaced apart on 2.2 inch (56 mm) centers are sufficient for the apertured slide 60 and the corresponding row of apertures 59 in side wall 39.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with lower bar-type nozzle housings 54 disposed with thick walls extending vertically and having elongated openings 55 directed upward through their thickness so that air applied under pressure to the lower plenum 53 is directed through the elongated openings 55 upward against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving the ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenums 51 and 53 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzle housings 54 are smoothly surfaced and parallel to one another to provide discontinuous smooth surfaces on which glass cullet is deposited when a glass sheet fractures in the cooling station 14. The lower bar-type nozzle housings 54 are interconnected by a pivotally mounted frame 50 that pivots about an axis extending longitudinally of the length of the cooling station 14. Frame pivoting means 49 is provided to pivot the frame 50, thereby pivoting the smoothly surfaced lower bar-type nozzle housings 54 into an oblique orientation that permits the glass fragments to slide to one side of the cooling station to clear the cooling station of glass fragments rapidly and efficiently. The lower bar-type nozzle housings 54 are returned to their normal position after the fragments of a prior glass sheet have slid to one side of the cooling station and before the next glass sheet is processed. The means to pivot the lower bar-type nozzles 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on a frame 64. A lug 65 connected to frame 64 actuates limit switch LS-5. Elevator means 66 in the form of one or more pistons is rigidly supported (each with a piston rod 68) on said frame. Vertical guides 69 control movement of the frame 64 in such a manner that when piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor 20 comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced from one another along the length of the downstream conveyor 20 and the additional doughnut rolls 74 are rigidly supported with their common upper tangent occupying a horizontal plane slightly above the uppermost surface of ring-like member 70.

Figure 17:
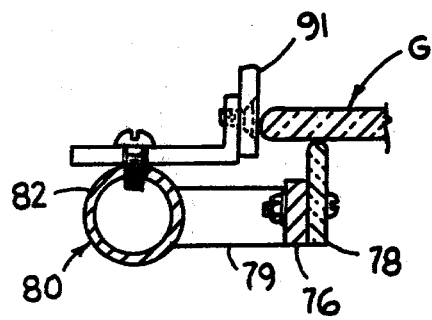
FIG. 17 is a fragmentary sectional view of the ring-like member and its reinforcing frame taken along the line 17—17 of FIG. 9.
Figure 18:
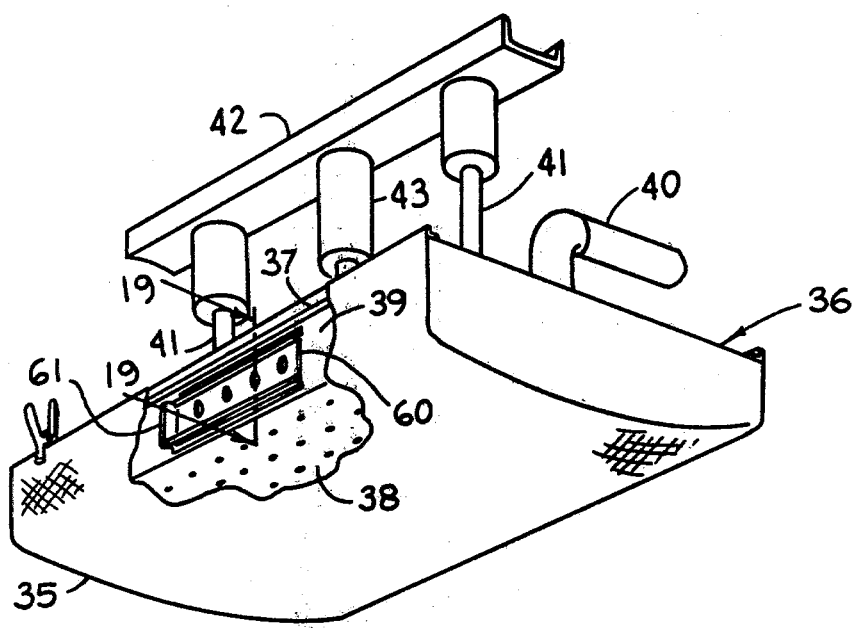
FIG. 18 is a fragmentary perspective view of the upper vacuum shaping mold with certain parts broken away to show other parts more clearly.

A preferred embodiment of the ring-like member 70 is shown in section in FIG. 17 and comprises a metal rail 76 that extends in the form of a ring-like structure disposed edgewise with its width forming the height of the rail attached for reinforcement to a series of non-metallic bars or bar portions 78 formed from cutting a board of non-metallic material such as an electric insulator material that is sold as SYNTHANE G-7 electric board by the Synthane Taylor Co. of Valley Forge, Pa. Connectors 79 are attached at their inner ends to the laterally outer surface of metal rail 76 at spaced points therealong and at their outer ends to a reinforcing frame 80. Both the latter and the frame-like member 70 are openended at their downstream ends for reasons to be explained.

The insulator material for the non-metallic bar or bar portions is composed of a series of fiber glass layers bonded together with an epoxy resin believed to be a highly cured methyl phenyl silicone. The bar portions 78 have a low heat conductivity and are of a low expansion material and are approximately 3 millimeters thick. Each of the non-metallic bar portions has a desired shape conforming to the shape of a different portion of the metal rail 76 except that the vertical heights of bars 78 are higher than the height of the metal rail 76. Each bar 78 is secured to the inner surface of the rigid metal rail 76 by nut and bolt means spaced throughout the peripheral length of the reinforcing metal rail 76 and extending through aligned bolt-receiving openings in the rigid metal rail 76 and the bar portions 78. The bottom edges of the bar portions 78 are aligned with the bottom edge of the rigid metal rail 76, although this is not absolutely necessary except that in such an arrangement the full height of the metal rail is provided in side-by-side relation to the bar portions 78 to reinforce the structural rigidity of the bar portions of non-metallic material with minimum heat capacity for the composite ring-like member 70.

The upper edge of each bar portion 78 of non-metallic material is disposed above the upper edge surface of the reinforcing rigid metal rail 76 and provides an upper edge surface of said ring-like member 70 so that when glass is deposited on the ring-like member, it makes contact only with the non-metallic glass engaging means provided by the bar portions 78 that are reinforced by the rigid metal rail in spaced relation below the line of glass sheet contact. The elevation of the glass supporting surface of the bar portions above the upper edge of the rigid reinforcing metal rail is preferably sufficient to provide a path of heat conduction through said non-metallic bar portions of sufficient length to have minor detrimental effects only in the cooling of the glass contacting portion, yet not so long as to endanger the structural strength of the non-metallic bar portions 78.

The ring-like member 70 has an upstream end portion 81, a pair of longitudinal side portions 83 and 85, each having an upstream end and a downstream end, and a pair of downstream end portions 87 and 89 extending transversely inwardly of the downstream ends of the respective longitudinal side portions 83 and 85. The upstream end portion 81 extends continuously between the upstream ends of the longitudinal side portions 83 and 85.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connectors means 79.

The frame 80 comprises a transversely extending upstream frame end portion 82 that faces the upstream end portion 81, longitudinal frame side portions 84 and 86 connected at their upstream ends to the opposite transverse ends of upstream frame end portion 82 and at their downstream ends to a pair of downstream frame end portions 88 and 90 as shown in FIGS. 7 to 9. Longitudinal frame side portions 84 and 86 are substantially parallel to side portions 83 and 85, respectively. Likewise, downstream frame end portions 88 and 90 are substantially parallel to downstream end portions 87 and 89, respectively. Spaces are provided between the inner ends of downstream end portions 87 and 89 and between the inner ends of downstream frame end portions 88 and 90 in longitudinal alignment with rolls 56.

A pair of upstream end stops 91 and 92 are attached to and located inwardly of upstream frame end portion 82. In addition, side stops 93 and 94 are attached to longitudinal frame side portions 84 and 86, respectively, and located transversely inwardly thereof. The side stops 93 and 94 are spaced from one another a distance slightly longer than the transverse dimension of the glass (about 5 millimeters more). The upstream end stops 91 and 92 are located a distance upstream from upstream end portion 81 in position to guide the location of the trailing edge of a glass sheet G so that the latter is oriented and aligned properly in the direction of the longitudinal dimension of the ring-like member 70. The side stops 93 and 94 insure that the glass sheet is aligned with the transverse dimension of the ring-like member 70 within permitted tolerance.

The reinforcing frame 80 is connected to a carriage 96 through connecting members 97. The carriage 96 is provided with upstanding ears 98 that terminate in internally threaded sleeves 100 that engage a worm drive 102 on each side of the carriage 96. This arrangement guides the movement of the ring-like member 70 between an upstream position at shaping station 16, a downstream position in alignment with sheet transfer means 17 and an intermediate position just downstream of the shaping station. The carriage 96 is reinforced by several arcuate cross braces (not shown) shaped to conform with the transverse curved shape defined by the upper surfaces of the lower bar-type nozzle housings 54 and the lower ends of the rows of upper pipe nozzles 52 so as to be capable of moving therebetween.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by ring-like member 70 and its supporting frame 80.

The worm drive 102 controls the position of the carriage 96 and its supported ring-like member 70 relative to one of the three positions of rest occupied by the ring-like member 70 during a cycle of operation. Limit switches LS-1, LS-2 and LS-3 are provided for actuation by a lug 104 attached to the carriage 96 to control different steps in a cycle of movement of the ring-like member 70 to be explained subsequently.

CYCLE OF OPERATION

FIGS. 3 to 9 depict a cycle of operation at the shaping station 16. In FIG. 3, a glass sheet G has arrived at a position in the shaping station 16 in spaced alignment between the lower shaping mold 34 and the upper vacuum mold 36. At this moment, the ring-like member 70 is returning in an upstream direction toward the shaping station 16.

In FIG. 4, the glass sheet G is being engaged simultaneously between molds 34 and 36, sensing means S having actuated a timer that stops the glass sheet G in a proper position at the shaping station 16 a predetermined time interval after having sensed the presence of a glass sheet passing through the exit of the furnace 12. Vacuum is supplied to the vacuum chamber of upper vacuum mold 36 to hold the shaped glass sheet G against the apertured lower wall 38 of the upper vacuum mold 36 so that the glass sheet will remain in contact with said apertured lower wall 38 when lower shaping mold 34 is retracted. The lower shaping mold 34 has been lifted in response to the sensor S actuating a timer circuit (not shown) that extends the piston 28 on sensing the passage of a glass sheet G into the shaping station 16. Limit switch LS-4 is released by the lifting of mold 34 to actuate the vacuum for upper vacuum mold 36 and to actuate a timer that controls the onset of the return of the lower shaping mold 34 to its recessed position.

In FIG. 5, lower shaping mold 34 has retracted, thereby resetting limit switch LS-4, and also retracting the upper vacuum mold 36 with suction still applied to hold the glass sheet thereagainst. The shaping station is now ready to receive the ring-like member 70 into position beneath the upper vacuum mold 36. When lug 104 engages limit switch LS-1, the ring-like member 70 is stopped at its aforesaid upstream position, depicted in FIG. 6.

At the same time, limit switch LS-1 releases the vacuum in upper vacuum mold 36, thereby permitting glass sheet G to be deposited onto ring-like member 70 when the latter occupies its upstream position. The selection of the upstream position of the ring-like member 70 is an important feature of the present invention.

FIGS. 7 to 9 show in detail how the glass sheet G is deposited on the ring-like member 70 with its trailing edge spaced a slight distance downstream of the upstream end stops 91 and 92 and with its side edges in transversely spaced relation between the side stops 93 and 94 and how sudden rapid movement of the ring-like member 70 in a downstream direction corrects the intentional longitudinal misalignment that is imposed on the glass sheet G relative to the ring-like member 70 and even corrects any misorientation between the glass sheet G and the ring-like member 70 that may occur rarely. FIG. 7 shows the relative position of a glass sheet G immediately after its deposit on the ring-like member 70 with its trailing edge in closely spaced relation downstream of the upstream end stops 91 and 92.

If the glass sheet is misoriented as well as misaligned, when the ring-like member 70 is started suddenly and rapidly, the glass sheet G remains stationary by inertia until either upstream end stop 91 or 92 engages the trailing edge of the glass sheet an instant befoe the other upstream end stop. The non-simultaneous engagement by upstream end stops 91 and 92 causes the trailing edge of the glass sheet to change its orientation until it rotates into proper orientation about a vertical axis when both upstream end stops 91 and 92 engage the trailing edge. FIG. 8 shows the glass sheet with its trailing edge engaging only one of the upstream edge stops and still longitudinally spaced from the other upstream end stop en route to correcting both its longitudinal alignment and angular orientation with respect to the ring-like member 70.

Continuation of the sudden rapid downstream movement of the ring-like member 70 toward the cooling station 14 maintains the glass sheet G in proper longitudinal alignment and proper angular orientation with the ring-like member 70 since the trailing edge of the glass sheet G remains in simultaneous contact with both upstream end stops 91 and 92 as is depicted in FIG. 9 for the remainder of its movement into the cooling station 14. In the event the upper vacuum shaping mold 36 is supporting the glass sheet G in proper orientation and releases the glass sheet properly onto the ring-like member 70 (an event that is quite likely to happen), the glass sheet G is deposited onto the ring-like member 70 when vacuum is released with the end stops 91 and 92 spaced upstream equal longitudinal distances from corresponding portions of the trailing edge of the glass sheet. In such a case, the glass sheet G is initially deposited with its trailing edge a short distance downstream of the upstream end stops 91 and 92 and the latter simultaneously contact the corresponding portions of the trailing edge of the glass sheet G when the ring-like member 70 is suddenly started toward the cooling station 14.

The glass sheet G supported on the ring-like member 70 is transferred to the cooling station 14 and rapidly transferred from the ring-like member 70 to the downstream conveyor 20. In order to accomplish this end, the doughnut rolls 56 are raised in unison to lift the glass sheet G off the ring-like member 70 while rotating in unison in a direction that propels the glass sheet in a downstream direction.

Figure 10:
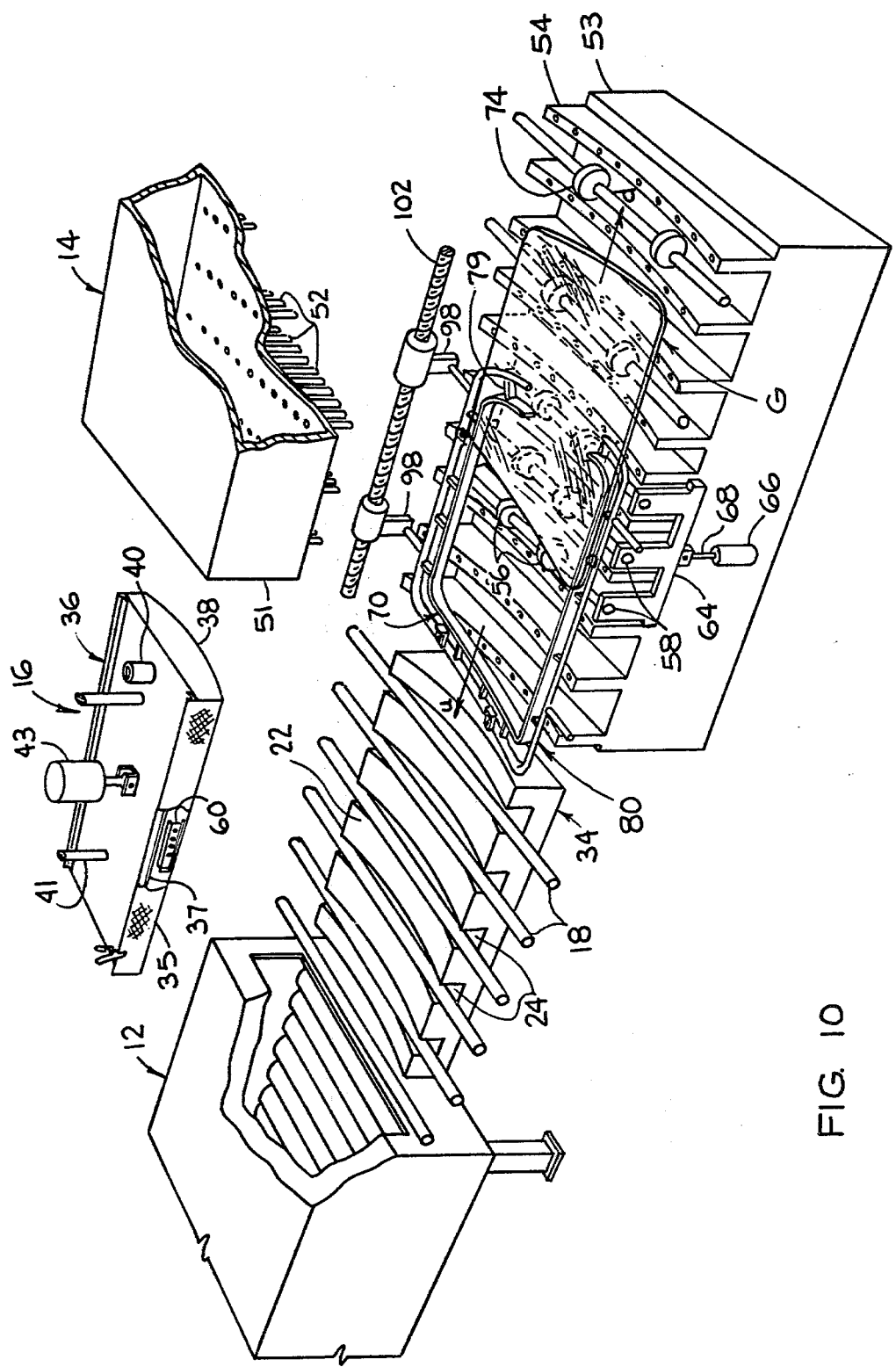
FIG. 10 is a fragmentary, perspectively, partly schematic view looking upstream of the apparatus from one side of the sheet transfer means showing the ring-like member returning upstream to the shaping station while the glass sheet downstream into a downstream conveyor, with certain parts omitted to show other parts more clearly.

FIG. 10 shows the cooled glass sheet G transferring from the doughnut rolls 56 of the sheet transfer means 17 in a downstream direction depicted by the arrow d to the doughnut rolls 74 of the downstream conveyor 20 while the ring-like member 70 is simultaneously beginning to return in an upstream direction depicted by the arrow u toward the intermediate position immediately downstream of the shaping station 16 in case a succeeding glass sheet G has not as yet been engaged by suction by the upper vacuum shaping mold 36. The ring-like member 70 moves directly into the upstream position at the shaping station 16 with its upstream end stops 91 and 92 slightly upstream of a vertical plane intersecting the trailing edge of the glass sheet G should the succeeding glass sheet be already supported by suction against the upper vacuum mold 36 and the lower shaping mold 34 has moved down to a vertical position sufficiently low to provide clearance for the ring-like member 70 to move to below mold 36 without stopping.

The ability of the ring-like member 70 to begin its return run to the shaping station 16 simultaneously with the transfer of the glass sheet from the sheet transfer means 17 to the downstream conveyor 20 represents an improvement in operating speed over that possible with the apparatus covered in U.S. Pat. No. 4,092,141 to Robert G. Frank and DeWitt W. Lampman. The differences in structure of the ring-like member 70 and the open-ended reinforcing frame 80 of the present specification (which provide open spaces between their downstream end portions and downstream frame end portions, respectively, which spaces are longitudinally aligned with the doughnut rolls 56 and with one another) compared to the closed transfer ring and closed reinforcing frame of the Frank and Lampman patented apparatus make it possible to commence the return run of the ring-like member 70 in an upstream direction toward the shaping station 16 much sooner than is possible with the Frank and Lampman patented apparatus. It is no longer necessary to wait for the piston rod 68 to first keep the doughnut rolls 56 sufficiently high to transfer the shaped and cooled glass sheet G over the upper edge surface of the tempering ring until the trailing edge of the glass sheet G has moved entirely downstream of the tempering ring and then for the piston rod 68 to lower the doughnut rolls 56 to an elevation below both the tempering ring and its reinforcing frame before it becomes possible to move the ring-like member in an upstream direction.

The transversely extending spaces between the laterally inner ends of the downstream end portions 87 and 89 of the ring-like member 70 and of the downstream frame end portions 88 and 90 of the reinforcing frame 80 of the apparatus described in this specification are made as small as possible consistent with the transverse dimension of the space occupied by the doughnut rolls 56 of the sheet transfer means 17 so as to limit the unsupported length of glass sheet periphery along the downstream end of the sheet. Since the downstream end of the glass sheet is the first element of the heated glass sheet to enter the furnace 12 and to enter the cooling station 14, it is chilled rapidly before the remainder of the length of the glass sheet G to a temperature at which it hardens sufficiently to avoid undue distortion from gravity sagging. The latter is a function of temperature and time. Minimizing the time that the leading end portion of the glass sheet remains unsupported while at an elevated temperature sufficient for gravity sagging minimizes the amount of uncontrolled sag in the leading end portion of the glass sheet.

To appreciate better the improved operation that results from this change in structure from a closed tempering ring reinforced by a closed reinforcing frame to an open-ended ring-type member reinforced by an open-ended reinforcing frame, reference is made to FIGS. 11 to 16. These latter drawings show how the present invention operates in detail, particularly in the vicinity of the sheet transfer means 17.

The side stops 93 and 94 are separated from one another a distance slightly more than the transverse dimension of the glass sheet that is within the tolerance limits set by the customer. Such spacing insures that the glass sheet G will be aligned transversely of the ring-like member 70 within a precision set by the customer. Sudden starting of the ring-like member 70 may affect any improper orientation or improper longitudinal alignment because of the upstream end stops 91 and 92. However, the presence of the side stops 93 and 94 insures that the maximum transverse misalignment is within tolerance limits set by the customer.

Figure 11:
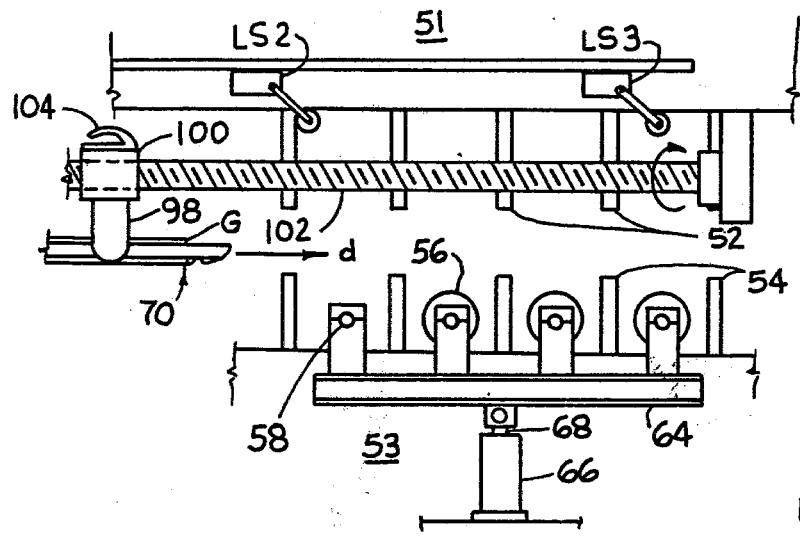
FIG. 11 is a fragmentary, partly schematic, longitudinal, elevational view taken along the lines 11—11 of the sheet transfer means depicted in FIG. 1, with parts omitted, to show a plurality of doughnut rolls of said sheet transfer means and its supporting frame in its retracted position awaiting the arrival of a glass sheet-bearing ring-like member at the sheet transfer means.

In FIG. 11, the glass sheet G is supported on the ring-like member 70, which is moving downstream between the upper pipe-type nozzles 52 aligned in transverse rows having convexly curved downward ends and the lower apertured, bar-type nozzles 54 having complementary, concavely curved upper ends and and air is blasted through the nozzles 52 and 54. The doughnut rolls 56 and their thin shafts 58 at sheet transfer means 17 are in the downward retracted position with frame 64 being retracted downwardly by the retraction of the piston rods 68 actuated by elevator means 66 while awaiting the arrival of the ring-like member 70 into position wherein lug 104 engages limit switch LS-2.

Figure 12:
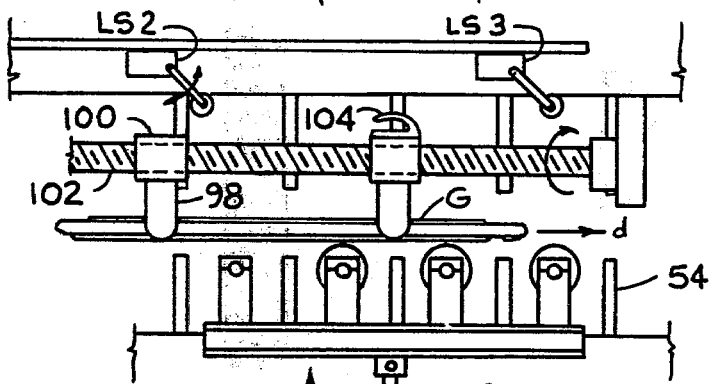
FIG. 12 is a view similar to FIG. 11 taken after the moment depicted in FIG. 11 and showing the sheet transfer means moving upward from its retracted position as the ring-like member arrives at the transfer station.

In FIG. 12, the worm drive 102 has driven carriage 96 and its supported ring-like member 70 part-way into the sheet transfer means 17. By this time, a timer circuit actuated by lug 104 engaging limit switch LS-2 in the downstream direction has caused the elevator means 66 to raise the pistons 68, thereby lifting frame 64, shafts 58 and rotating doughnut rolls 56 into intermediate positions approaching the level at which they lift the glass sheet G off the ring-like member 70. This upward movement releases limit switch LS-5, thereby causing doughnut rolls 56 to start to rotate.

Figure 13:
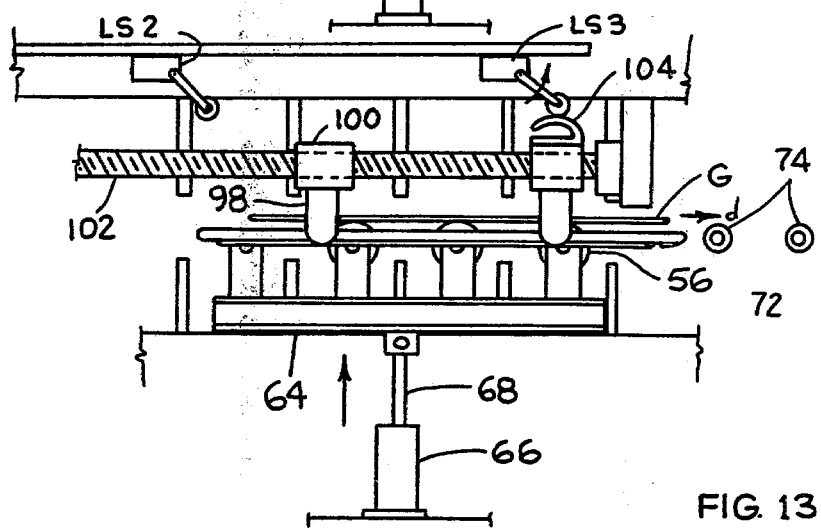
FIG. 13 is a view similar to FIG. 12 and taken after the moment depicted in FIG. 12, showing the sheet transfer means rolls lifted upward to their transfer position to lift the shaped glass sheet above the ring-like member for transfer to a downstream conveyor located beyond the sheet transfer means.
Figure 14:
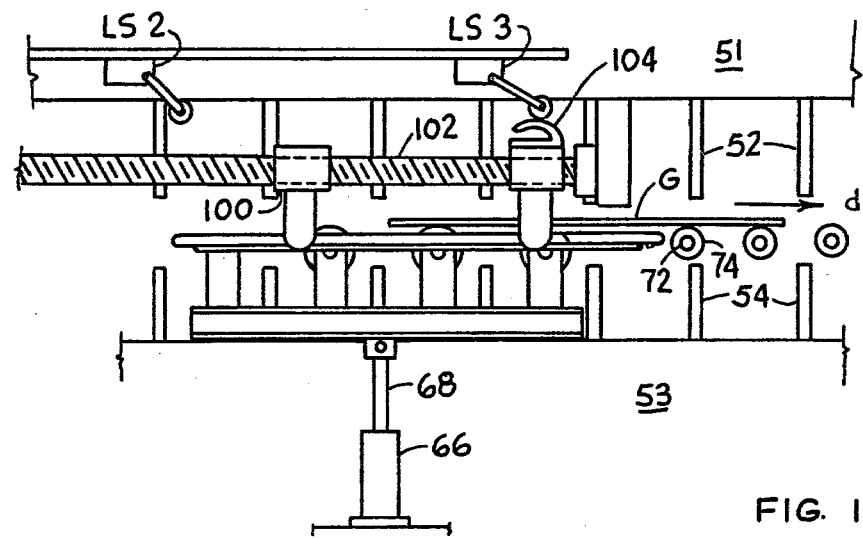
FIG. 14 is a view similar to FIG. 13 taken immediately after the moment depicted in FIG. 13, showing the shaped glass sheet beginning to move toward the right into the downstream conveyor while the ring-like member of special construction is over the sheet transfer means.

In FIG. 13, the ring-like member 70 has arrived at its most downstream position where lug 104 has engaged limit switch LS-3 to stop the worm drive 102. At this time, the rotating doughnut rolls 56 have begun to transfer the glass sheet G over the ring-like member 70 and its open-ended reinforcing frame 80 toward the most upstream doughnut roll 74 of the downstream conveyor 20. In FIG. 14, the piston rod 68 remains fully extended as the glass sheet G continues to move downstream further into the downstream conveyor 20.

Figure 15:
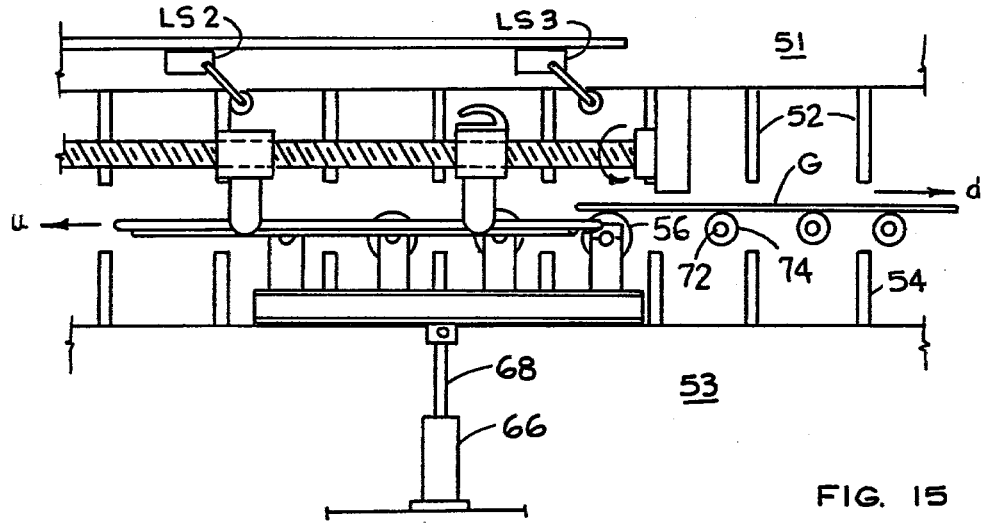
FIG. 15 is a view similar to FIG. 14, taken shortly thereafter and showing the ring-like member starting to move to the left on its return to the shaping station before the shaped glass sheet has completed its transfer to the downstream conveyor.

In FIG. 15, before the trailing edge of the glass sheet G has cleared the open downstream end of the ring-like member 70, the worm drive 102 has begun to move the ring-like member upstream toward the shaping station 16. A timer actuated by limit switch LS-3 controls the onset of the reverse rotation of the worm drive 102 that controls the return movement of the ring-like member 70 in an upstream direction.

Figure 16:
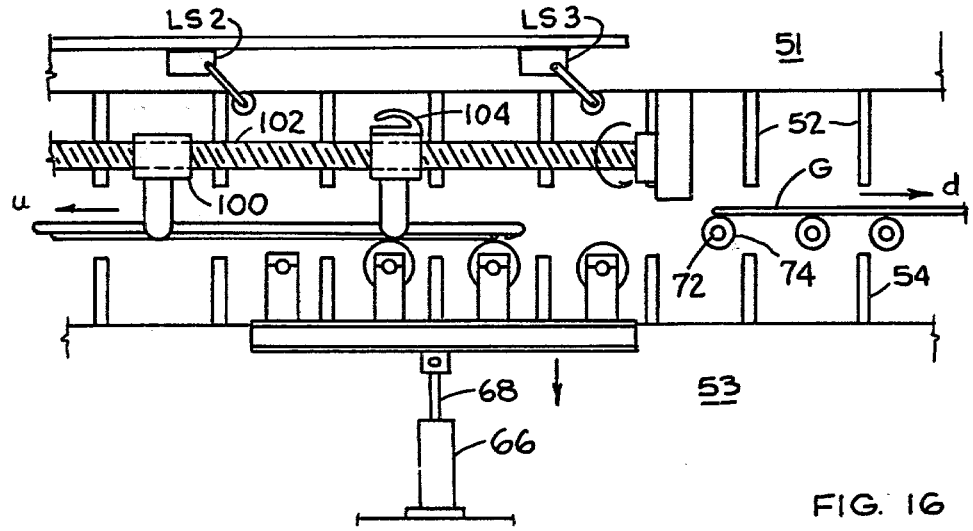
FIG. 16 is a view similar to FIG. 15 showing the ring-like member continuing its return to the shaping station while the sheet transfer means is being lowered to its retracted position.

In FIG. 16, rolls 56 have transferred the glass sheet G to the doughnut rollers 74 fixed to additional conveyor shafts 72 of the downstream conveyor 20. At this time, another timer circuit controlled by limit switch LS-3 causes the elevator means 66 to start to retract the piston rods 68, thereby lowering the doughnut rolls 56 and their thin shafts 58. Previously, the lowering of lifting frame 64 to its recessed position actuated limit switch LS-5. which caused the worm drive to move the carriage 96 in an upstream direction into a position where lug 104 engaged limit switch LS-1, thereby permitting ring-like member 70 to be in its intermediate position to await the completion of the shaping of a succeeding glass sheet which is indicated by the resetting of limit switch LS-4 when lower shaping mold 34 retracts. However, if the apparatus operates rapidly enough, as indicated by the time-out of a timer circuit whose time starts by a subsequent actuation of sensing means S, the reset limit switch LS-4 permits ring-like member 70 to move upstream through the intermediate position without stopping at the intermediate position.

During the time that the ring-like member moves into or through the intermediate position controlled by the engagement of lug 104 against limit switch LS-2, lower shaping mold 34 remains retracted sufficiently to provide clearance for the succeeding glass sheet G to enter into a position of alignment between the upper vacuum mold and the lower shaping mold 34, as depicted in FIG. 3.

It is preferred that the thin shafts 58 on which the doughnut rolls 56 are mounted be rotating when the set of rolls 56 is lifted into position above that occupied by the lower surface of the glass sheet G resting on the ring-like member 70. The rolls 56 may rotate continuously or intermittently. In the latter case, it is imperative that the rolls 56 rotate during the portion of their cycle of vertical movement when they engage the lower surface of a glass sheet being transferred.

In order to avoid marking the glass during its transfer from the set of doughnut rolls 56 to the rotating additional doughnut rollers 74 fixed for rotation to the additional conveyor shafts 72, the peripheral speed of the vertically movable rolls 56 located at the sheet transfer means 17 is equal to the peripheral speed of the doughnut rollers 74 of the downstream conveyor 20. In addition, the glass sheet G is cooled rapidly enough while resting on the ring-like member 70 to at least harden its surfaces sufficiently to enable the latter to withstand rolling contact with said rotating rolls 56 without developing substantial surface defects that would cause the resulting glass articles to be rejected by a customer. Preferably, the cooling is performed at a rate sufficient to impart at least a partial temper to the glass sheet before lifting the latter onto said rotating rolls.

Glass sheets of non-rectangular outline transported along a long roller conveyor extending through a furnace tend to become misaligned and misoriented. However, the orientation and alignment of glass sheets may be readily corrected by using the method and apparatus for orienting and aligning glass sheets adjacent to the downstream exit of the furnace described and claimed in U.S. Pat. No. 4,058,200 to Robert G. Frank.

Important benefits derived from the described apparatus is the rapid transfer of each glass sheet G from the frame-like member 70 onto the doughnut rolls 74 of the downstream conveyor 20 via the upwardly moving doughnut rolls 56 of the sheet transfer means 17, the more rapid return of the ring-like member 70 to the shaping station 16, the more accurate positioning of each successive glass sheet on the ring-like member 70 and the ability of the ring-like member 70 to move downstream from the shaping station 16 to the sheet transfer means 17 as rapidly as possible while assuring proper orientation and alignment of the glass sheet. In prior art apparatus, too rapid a transfer caused misalignment of the glass and consequently mishaping.

The present invention permits each glass sheet in a series of sheets to be conveyed on a relatively inexpensive roller-type conveyor while it is heated to its deformation temperature, has its orientation and alignment corrected a short distance upstream of the shaping station, shaped to the desired configuration at the shaping station 16 using complementary shaping molds that are readily replaceable with molds conforming to different families of production patterns, readily transferred to a position of support by vacuum against the upper vacuum shaping mold 36 while the lower shaping mold 34 is retracted and the ring-like member 70 is introduced into a position aligned below upper vacuum shaping mold 36. The shaped glass sheet G is deposited in non-tilting relation onto the outline support surface provided by the ring-like member by dropping the glass sheet with its tailing edge slightly downstream of the upstream end stops of the ring-like member 70 and suddenly starting the ring-like member in a downstream direction toward the cooling station 14 to slide the supported glass sheet by inertia into registry with the upstream end stops 91 and 92 so that the shaped glass sheet G is supported adjacent its marginal edge only on said ring-like member with its upper and lower major surfaces exposed to blasts of cool tempering medium, such as air or any other suitable well-known tempering medium, during the conveyance of the shaped glass sheet G to the sheet transfer means 17 that transfers the shaped and tempered glass sheet G to a downstream conveyor that leads to an unloading station. In addition, the ring-like member 70 is free to start returning to the shaping station 16 before the glass sheet has completely transferred from the ring-like member 70 to the downstream conveyor 20. Both speed of operation and precision of glass sheet shaping are improved by virtue of the present invention for reasons that have been explained previously.

The form of the invention shown and described in this disclosure represents an illustrative preferred embodiment thereof. It is understood that various changes may be made in the structure and method of operation without departing from the gist of the invention except insofar as defined in the claimed subject matter that follows.

I claim:

1. Apparatus adapted for supporting a glass sheet slightly within its peripheral margin during its conveyance from a first station to a second station downstream of said first station comprising a ring-like member having an upper edge surface conforming in elevation and outline to the shape of said glass sheet and extending slightly within the peripheral margin of said glass sheet, said ring-like member comprising a pair of longitudinal side portions each having an upstream end and a downstream end and extending between its ends along one or the other lateral side edges of said member, an upstream end portion extending continuously between the upstream ends of said longitudinal side portions and a pair of downstream end portions, one of said downstream end portions extending transversely inwardly of the downstream end of one of said longitudinal side portions and the other of said downstream end portions extending transversely inwardly of the downstream end of the other of said longitudinal side portions, the laterally inner ends of said downstream end portions being laterally spaced from one another to provide a transversely extending space therebetween.

2. Apparatus as in claim 1, further including a reinforcing frame spaced outward from said ring-like member, means connecting said reinforcing frame to said ring-like member at spaced portions therealong, said reinforcing frame having a plan outline spaced outwardly of the perimeter of said supported glass sheet and comprising an upstream frame end portion connected to said upstream end portion, a first longitudinal side frame portion attached to one of said longitudinal side portions, a second longitudinal side frame portion attached to the other of said longitudinal side portions, a first downstream frame end portion attached to one of said pair of downstream end portions and a second downstream frame end portion attached to the other of said pair of downstream end portions, said downstream frame end portions extending laterally inwardly from the downstream ends of said longitudinal side frame portions, the laterally inner ends of said downstream end frame portions being laterally spaced from one another to provide a transversely extending space therebetween longitudinally aligned with said transversely extending space between said laterally inner ends of said downstream edge portions.

3. Apparatus as in claim 1 or 2, further including upstream end stop means attached to said apparatus and located adjacent to and upstream of said upstream end portion and adapted to be engaged by spaced edge portions along the upstream edge of said supported glass sheet, said apparatus being free of downstream end stop means in the vicinity of said downstream end portion.

4. Apparatus as in claim 3, further including first side stop means attached to said apparatus and located adjacent to and transversely outward of one of said pair of longitudinal side portions and second side stop means attached to said apparatus and located adjacent to and transversely outward of the other of said pair of longitudinal side portions, said first side stop means being transversely spaced from said second side stop means by a distance slightly more than the transverse dimension of said supported glass sheet.

5. Apparatus as in claim 1 or claim 2, further including glass sheet transfer means comprising a set of rolls mounted on thin shafts at said second station, said rolls being longitudinally aligned with said space extending transversely between said downstream end portions, means to lift said rolls to an elevated position slightly above said upper edge surface from a lowered position below said ring-like member, and means operatively connected to said set of rolls to coordinate the movement and rotation of said set of rolls with the movement of said ring-like member to hold said set of rolls in said lowered position when said ring-like member moves from said first station to said second station and to lift said set of rolls to said elevated position when said ring-like member arrives at said second station.

6. Apparatus as in claim 5, further including roll rotating means responsive to the lifting of said set of rolls to cause said set of rolls to rotate in unison.

7. Apparatus as in claim 6, further including means to start to return said ring-like member from said second station to said first station before said means operatively connected to said set of rolls starts to return said set of rolls to said lowered position, whereby said glass sheet is transferred downstream from said second station while said ring-like member is simultaneously being transferred upstream from said second station.

8. Apparatus as in claim 7, further including means to stop said set of rolls from rotating when the upstream edge of said glass sheets is completely clear of said set of rolls in its movement downstream of said second station.

* * * * *

UNITED STATES PATENT AND TRADEMARK OFFICE
CERTIFICATE OF CORRECTION

PATENT NO. : 4,185,986
DATED : January 29, 1980
INVENTOR(S) : Robert G. Frank

It is certified that error appears in the above-identified patent and that said Letters Patent are hereby corrected as shown below:

Column 5, line 59, insert --raising-- after "while".

Column 6, line 24, "combustion" should be --combination--.

Column 9, line 26, "0.09" should be --.09--.

Column 16, line 1, delete the second "and".

Column 17, line 62, "tailing" should be --trailing--.

*Signed and Sealed this*

*Twenty-ninth* Day of *July 1980*

[SEAL]

*Attest:*

SIDNEY A. DIAMOND

*Attesting Officer*     *Commissioner of Patents and Trademarks*